United States Patent
Van Aert et al.

(10) Patent No.: US 10,982,035 B2
(45) Date of Patent: *Apr. 20, 2021

(54) POLYURETHANE RESIN FOR INK JET INK

(71) Applicant: AGFA NV, Mortsel (BE)

(72) Inventors: Hubertus Van Aert, Mortsel (BE); Ellen Bertels, Mortsel (BE); Johan Loccufier, Mortsel (BE)

(73) Assignee: AGFA NV, Mortsel (BE)

( * ) Notice: Subject to any disclaimer, the term of this patent is extended or adjusted under 35 U.S.C. 154(b) by 4 days.

This patent is subject to a terminal disclaimer.

(21) Appl. No.: 16/343,806

(22) PCT Filed: Oct. 12, 2017

(86) PCT No.: PCT/EP2017/076002
§ 371 (c)(1),
(2) Date: Apr. 22, 2019

(87) PCT Pub. No.: WO2018/077624
PCT Pub. Date: May 3, 2018

(65) Prior Publication Data
US 2019/0276581 A1    Sep. 12, 2019

(30) Foreign Application Priority Data
Oct. 28, 2016 (EP) .................................. 16196224

(51) Int. Cl.
| | | |
|---|---|---|
| C08G 18/08 | (2006.01) |
| C09D 11/36 | (2014.01) |
| C08G 18/12 | (2006.01) |
| C08G 18/34 | (2006.01) |
| C08G 18/42 | (2006.01) |
| C08G 18/48 | (2006.01) |
| C08G 18/66 | (2006.01) |
| C08G 18/75 | (2006.01) |
| C08G 18/76 | (2006.01) |
| C09D 11/10 | (2014.01) |
| C08G 18/40 | (2006.01) |
| C09D 11/00 | (2014.01) |
| C09D 11/30 | (2014.01) |

(52) U.S. Cl.
CPC ......... *C08G 18/0823* (2013.01); *C08G 18/12* (2013.01); *C08G 18/348* (2013.01); *C08G 18/4018* (2013.01); *C08G 18/4213* (2013.01); *C08G 18/4862* (2013.01); *C08G 18/6625* (2013.01); *C08G 18/755* (2013.01); *C08G 18/7621* (2013.01); *C09D 11/00* (2013.01); *C09D 11/10* (2013.01); *C09D 11/30* (2013.01); *C09D 11/36* (2013.01)

(58) Field of Classification Search
None
See application file for complete search history.

(56) References Cited

U.S. PATENT DOCUMENTS

| | | | | |
|---|---|---|---|---|
| 7,495,058 B2* | 2/2009 | Kitada | ............... | C08G 18/6659 525/453 |
| 9,856,435 B2* | 1/2018 | Malaba | ............... | C08G 18/0823 |
| 2008/0092309 A1* | 4/2008 | Ellis | ................... | D06P 5/30 8/478 |
| 2008/0194757 A1 | 8/2008 | Fujita et al. | | |
| 2016/0264808 A1* | 9/2016 | Kido | ................... | C09D 11/106 |

FOREIGN PATENT DOCUMENTS

| | | | |
|---|---|---|---|
| JP | 2011-140560 | * | 7/2011 |
| JP | 2011-140560 A | | 7/2011 |
| JP | 2015-163678 A | | 9/2015 |
| WO | 2007/023145 A2 | | 3/2007 |

OTHER PUBLICATIONS

Partial English translation of JP 2011-140560, 4 pages, Japan, Jul. 21, 2011.*
Official Communication issued in International Patent Application No. PCT/EP2017/076002, dated Dec. 22, 2017.

* cited by examiner

*Primary Examiner* — Tae H Yoon
(74) *Attorney, Agent, or Firm* — Stinson LLP

(57) ABSTRACT

A polyurethane resin having an anionic group and a polyalkylene oxide in a side chain thereof is obtainable by reacting a polyester polyol, a polyether diol, a polyol containing an anionic group, and a polyisocyanate, and the polyester polyol is obtained by reacting an aromatic polycarboxylic acid and a polyol. The polyurethane resin can be used as binder in an ink jet ink and provides excellent scratch and solvent resistance of printed images.

14 Claims, No Drawings

POLYURETHANE RESIN FOR INK JET INK

CROSS REFERENCE TO RELATED APPLICATIONS

This application is a 371 National Stage Application of PCT/EP2017/076002, filed Oct. 12, 2017. This application claims the benefit of European Application No. 16196224.6, filed Oct. 28, 2016, which is incorporated by reference herein in its entirety.

BACKGROUND OF THE INVENTION

1. Field of the Invention

The present invention relates to a polyurethane resin and more specifically to the use of this polyurethane resin as a binder in aqueous ink jet inks.

2. Description of the Related Art

Inkjet printers have been widely used as digital signal output equipment in general homes because of having advantages such as low noise, low running cost, and easiness of colour printing.

In recent years, inkjet techniques have been increasingly utilized not only in such homes but also for industrial applications such as displays, posters, bulletin boards, packaging, textile, etc. In such applications durability such as light fastness, water resistance, and wear resistance are important requirements of the printed images and pigment based inks therefore have been developed.

Inks, such as solvent-based inkjet inks using an organic solvent as a vehicle, and ultraviolet curable inkjet inks including a polymerisable monomer as a main component have been used widely in industrial applications.

However, the solvent-based inkjet inks are not environmentally preferable because the solvent is evaporated in the atmosphere, and the ultraviolet curable inkjet inks have limited application fields because they may have skin sensitizing properties depending on the monomer to be used and an expensive ultraviolet irradiation apparatus is required to be incorporated to the main body of a printer.

In view of such background, there have been developed pigments based aqueous inks for inkjet recording capable of being directly used for printing on porous and non-porous substrates and which give less environmental load. These inks are characterized by the presence of a resin which binds the pigments and prevents rubbing off the images from the substrate leading to an improved solvent and scratch resistance.

WO2007/023145A describes a polyurethane dispersant resin having a polyurethane backbone with pendant hydrophilic polyalkylene oxide based side groups. The polyurethane resin backbone is essentially free of hydrolysable ester bonds, hence does not contain polyester polyols.

JP2011140560A discloses a polyurethane resin as a binder for an aqueous ink jet ink. The urethane resin provides images with high abrasion resistance and a high alkali resistance, and at the same time a good storage and jetting stability is obtained. The polyurethane resin comprises anionic groups and polyalkylene side chains to guarantee a good ink storage and jetting stability of the aqueous ink. No data on chemical resistance against organic solvents and adhesion onto non-porous substrates such as polyvinyl chloride or PET of the printed images are disclosed. Resistance of printed images against organic solvents such as IPA (Isopropanol) is very preferred as this organic solvent is frequently used to clean the images, especially if these images are printed for outdoor applications such as on vehicles, banners, posters etc. . . .

JP2015163678A discloses an aqueous pigment composition for printing on a porous substrate such as textile which guarantees an improved washing fastness and rubbing resistance of the images on the fabric. The aqueous composition comprises pigment particles containing a urethane resin obtained by reacting polyester polyols, polyols with an ionic or non-ionic group and polyisocyanate. The inks disclosed in JP2015163678A do not comprise a water-soluble organic solvent. Water soluble organic solvents are added to aqueous inks in order to improve storage stability at low temperatures and to prevent poor firing quality or completely plugged nozzles due to water evaporation on inactive uncapped nozzles. The time of inactivity of ink jet nozzles before the decrease of the drop firing quality is called 'decap time' and should be as long as possible.

No document discloses the concept for improving organic solvent resistance and dry and wet scratch resistance of ink jet printed images on porous and non-porous substrates jetted by means of aqueous ink jet inks and at the same time obtaining an improved storage of the ink.

SUMMARY OF THE INVENTION

Preferred embodiments of the invention provide a solution for the above stated problems. The preferred embodiments have been achieved by incorporating a polyurethane resin as defined below into aqueous ink jet inks.

According to another aspect, the present invention includes an aqueous ink jet ink composition, wherein the polyurethane resin is included as a binder.

According to another aspect, the present invention includes a method of printing images with the aqueous ink jet ink as defined below. This method is also defined below.

Other features, elements, steps, characteristics and advantages of the present invention will become more apparent from the following detailed description of preferred embodiments of the present invention. Specific embodiments of the invention are also defined in the dependent claims.

DETAILED DESCRIPTION OF THE PREFERRED EMBODIMENTS

A. Polyurethane Resin

The polyurethane resin of the present invention is characterised by the fact that the resin has an anionic group and a polyalkylene oxide in a side chain of the polyester urethane backbone. Both the anionic group and the polyalkylene oxide increase the dispersibility of the resin in water. The polyester urethane backbone is obtained by reacting a polyester polyol containing aromatic moieties with a polyisocyanate. The polyurethane resin is thus obtained by reacting a polyester polyol, a diol containing a polyether diol, a polyol containing an anionic group and a polyisocyanate.

A.1. Polyester Polyol

The polyester polyol used in the reaction of the invention, is obtained by reacting an aromatic polycarboxylic acid and a polyol.

The polyester polyol is a resin formed by an esterification reaction or transesterification reaction between at least one aromatic polycarboxylic acid component and at least one polyol component. Specific examples of the aromatic polycarboxylic acid include dibasic acids such as phthalic acid, isophthalic acid, terephthalic acid, 2,6-Naphthalenedicarboxylic acid, 1,4-naphthalenedicarboxylic acid, 1,5-naphthalenedicarboxylic acid; tri- or higher-valent polybasic acids such as trimellitic acid and pyromellitic acid; and acid anhydrides thereof, for example, phthalic anhydride, trimellitic anhydride, pyromellitic anhydride; and the like. As the aromatic polycarboxylic acid component, one or more dibasic acids selected from the dibasic acids mentioned above, lower alkyl ester compounds of these acids, and acid anhydrides are mainly used. If necessary, a monobasic acid such as benzoic acid, crotonic acid or p-t-butyl benzoic acid; a tri- or higher valent polycarboxylic acid such as trimellitic anhydride, methylcyclohexene tricarboxylic acid or pyromellitic anhydride; or the like can be further used in combination with the polycarboxylic acid component. It is preferred that the polyester is prepared using dicarboxylic acids which give linear polymer chains, in particular 1,4-terephtalic acid copolymers give a better performance regarding colloidal stability in aqueous medium, than phthalic acid anhydride copolymers. Besides terephthalic acids, one could use also other para- or linear substituted polycarboxylic acids to obtain the desired properties such as 2,6-naphthalenedicarboxylic acid or 1,5-naphthalenedicarboxylic acid.

The preferred carboxylic acid is an aromatic dicarboxylic acid such as terephthalic acid and isophthalic acid. The content of aromatic acids within the resin is equal to or higher than 30 mol % and preferably equal to or higher than 50 mol % with respect to the total amount of dicarboxylic acids or anhydrides. Ink jet inks comprising polyurethane resins obtained by reaction of polyesters polyols containing aromatic polycarboxylic acids do show an improved colloidal stability and lead to images with an improved solvent resistance and an improved dry and wet scratch resistance. The good results obtained with terephthalic acids and isophthalic acids has probably to do with obtaining a certain amount of crystallinity of the polyurethane resin or providing linear amorphous chains which contribute more to the desired physical properties such as scratch resistance and solvent resistance. Introducing phthalic acid anhydride or isophthalic acid in terephthalic acid based polyesters reduces the crystallinity or chain end-to-end distance and improves the solubility in organic solvents. For terephthalic acid based polyester polyols, it is preferred to use copolymers of terephthalic acid with isophthalic acid or phthalic acid anhydride, more preferably having at least 20 mol % isophthalic acid or phthalic acid anhydride units. For the same reason polyester polyols with only phthalic acid anhydride are less preferred than copolymers where terephthalic acid is incorporated. Polyester polyols based on only phtalic acid anhydride could be very soluble in the polymerization solvent for the PU preparation, but a dried ink layer or coating will have also a lower solvent resistance. Therefore it is preferred that the aromatic polyester polyol contains between 20 and 80 mol % of terephthalate groups on the basis of the total amount of dicarboxylic acids (or acid anhydrides) in the polyester polyol.

Very suitable polyester polyols containing terephthalic ester units and isophthalic ester units in a ratio of 1:1 mol % are: Dynacoll 7150 supplied by Evonik, Marl, Germany, Vylon 220 from Toyobo, Osaka Japan and Elitel 1401 obtained from Unitika Ltd Dusseldorf Germany.

In order to obtain the desired properties of the polyester polyol and using a high content of terephthalic acid, one could use also a mixture of dicarboxylic acids. For example to reduce the crystallinity one could use a mixture of terephthalic acid and adipic acid. Consequently one could use also polyester polyols based on a mixture of aromatic polycarboxylic acids and aliphatic dicarboxylic acids such as adipic acid, succinic acid, methylcyclohexene tricarboxylic acid, fumaric acid and sebacic acid or anhydrides such as tetrahydrophthalic acid anhydride, hexahydrophtalic acid anhydride, maleic acid anhydride and succinic acid anhydride.

Polyester polyols with a high content of terephthalic acid could have a poor solubility in the preparation solvent (e.g. acetone) for the PU preparation or could have a too high degree of crystallinity in order to get good adhesive properties. In particular this is the case when only non-branched diols are used for the polyester polyol, such as 1,2-ethylene glycol or 1,4-butane diol. When using terephthalic acid based polyester polyols with more than 35 mol % terephthalic acid, one can preferably use a mixture of different non-branched diols (e.g. a mixture of 1,2-ethylene glycol and 1,4-butane diol) or a mixture of a non-branched diol (e.g. ethylene glycol) with a branched diol (e.g. neopentyl glycol). When using mixtures of different diols for the polyester polyol, one could use high terephthalic acid contents, even up to 100 mol % based of the total dicarboxylic acid content.

Specific examples of the polyol component include diols such as ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. For the polyol component, diols as mentioned above are mainly used, and if necessary, tri- or higher-valent polyols such as glycerin, trimethylolethane, trimethylolpropane and pentaerythritol can be further used in combination with the diols. Aromatic diols can also be used to increase the content of aromatic moieties in the polyester polyol. Suitable aromatic diols are: p-xylene glycol, 1,5-naphthalenedimethanol, 1,4-naphthalenedimethanol, 4,4'-bis(hydroxymethyl)biphenyl, bis(hydroxyethyl) terephthalate, bis(2-hydroxypropyl) terephthalate, 1,5-naphthalenedicarboxylic acid 1,5-bis(2-hydroxyethyl) ester, 4,4-bis(hydroxymethyl) diphenylmethane, 2,2-bis(4-β-hydroxyethoxyphenyl)propane (diethoxylated bisphenol A) and bis[p-(2-hydroxyethoxy)phenyl]methane.

Preferably diols with a Mw equal to or less than 400 are used together with the polyester polyol. These polyols can be used singly or as mixture of two or more kinds.

A.2. Polyether Diol

The polyether diol which is used in the present invention is preferably obtained by addition polymerization of an alkylene oxide with at least one compound having two or more active hydrogen atoms. Examples of this compound include ethylene glycol, diethylene glycol, triethylene glycol, propylene glycol, trimethylene glycol, 1,3-butanediol, 1,4-butanediol, 1,6-hexanediol, glycerol, trimethylolethane and ethylolpropane. Examples of the alkylene oxide include ethylene oxide, propylene oxide, butylene oxide, styrene oxide, epichlorohydrin and tetrahydrofuran. Preferred polyether diols are compounds according to Formula 1.

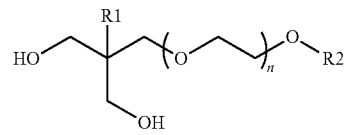

Formula 1 wherein R1 is methyl or ethyl, R2 is H or $C_1$-$C_4$ alkyl and n represents an integer from 5 to 50, more preferably from 10 to 40 and most preferably from 15 to 30.

The polyether diol preferably used in the present invention, is Ymer N120 or Tegomer D 3403, i.e. α-[2,2-bis (hydroxymethyl)butyl]-ω-methoxy-Poly(oxy-1,2-ethanediyl). These diols can be prepared from trimethylol propane oxetane (TMPO). A possible synthesis procedure is described by Fock, J.; Möhring, V., Polyether-1,2- and -1,3-diols as macromonomers for the synthesis of graft copolymers, 1. Synthesis and characterization of the macromonomers. *Die Makromolekulare Chemie* 1990, 191 (12), 3045-3057.

In general also other polyether 1,2- or 1,3-diols can be used. For a good stability the polyether graft is preferably well water soluble in order to give a good steric stabilisation. In the case of Ymer N120 the polyether is only composed of ethylene oxide segments, but this can also be a copolymer of different alkylene oxides. Furthermore in the current macromonomer diol the end group is a methoxy group, this end group can also be other end groups such as a hydrophilic end group (such as carboxylic, sulphate, ect.) in order to have also electro-steric stabilisation. The content of the polyether diol in the polyurethane resin is preferably 30 wt. % or less, but more than 1 wt. % with respect to the polyurethane resin, more preferably the polyether diol content is equal to or less than 15 wt. % and more than 2 wt. % with respect to the polyurethane resin. A content of the polyether diol of less than 30 wt. %, but more than 1 wt. % with respect to the polyurethane resin, has an additional improvement in scratch resistance and solvent resistance of the jetted and dried image with respect to polyether diol content outside this range.

From the above text it is clear that the polyalkylene oxide group is present as a side group from the diol (preferably from the 1,2-diol or 1,3-diol) and after reacting with the other polyols to form the resin of the invention, the polyalkylene oxide groups will be present as side chains or polyalkylene oxide based side groups being linked via covalent bonds to the backbone of the resin.

A.3. Polyols Containing an Anionic Group

Polyols containing an anionic group are polyols containing an anionic group selected from the group of carboxylates, sulfonates, sulphate, phosphonates and phosphates. Preferably, the anionic group is a carboxylate anion and/or carboxylic acid. The ratio carboxylate anion/carboxylic acid depends on the pH of the medium in which the polyurethane resin is dispersed. Examples of the carboxyl-containing polyols such as 2,2'-dimethylolpropionic acid, 2,2'-dimethylol butanoic acid, 2,2'-dimethylolbutyric acid, 2,2'-dimethylol valeric acid and their dicarboxylic variants. It is preferred to use among them 2,2-dimethylol propionic acid. The presence of the anionic group in the polyurethane resin provides water solubility or water dispersibility of the resin. To obtain wet scratch resistance and solvent resistance, the content of the anionic group is preferably equal to or less than 2.0 wt. %, more preferably less than 1.5 wt. %, but more than 0.03 wt. % with respect to the polyurethane resin. A content of anionic group within this range between 0.03 and 2.0 wt. %, has an additional improvement in wet wipe and scratch resistance of the jetted and dried image with respect to anionic group content outside this range.

As a basic compound for neutralizing the aforementioned anionic group, ammonia, triethylamine, morpholine, monoethanolamine and diethylethanolamine, 2-amino-2-methyl-1-propanol, NaOH, KOH and LiOH can be used.

A.4. Polyisocyanates

Specific examples of the organic polyisocyanate compound that is reacted with the polyester polyol include aliphatic diisocyanates such as lysine diisocyanate, hexamethylene diisocyanate and trimethylhexane diisocyanate; cyclic aliphatic diisocyanates such as hydrogenated xylene diisocyanate, isophorone diisocyanate, methylcyclohexane-2,4 (or 2,6)-diisocyanate, 4,4'-methylenebis(cyclohexyl isocyanate) and 1,3-(isocyanatomethyl)cyclohexane; aromatic diisocyanates such as tolylene diisocyanate, xylene diisocyanate and diphenylmethane diisocyanate; organic polyisocyanates themselves, including tri- or higher-valent polyisocyanates such as lysine triisocyanate; adducts each composed of such an organic polyisocyanate with a polyhydric alcohol, a low molecular weight polyester resin or hydrogen; and cyclised polymers (for example, isocyanurate), biuret type adducts and the like, each formed from various diisocyanate compounds mentioned above.

It is preferable, from the viewpoint of storage stability of the ink composition, that the organic polyisocyanate compound according to the invention include at least one selected from non-yellowing type polyisocyanate compounds such as isophorone diisocyanate, hexamethylene diisocyanate and lysine diisocyanate, and it is more preferable that the organic polyisocyanate compound include at least isophorone diisocyanate.

Furthermore, the organic polyisocyanate compounds can be used singly alone or as mixtures of two or more kinds.

A.5 Reaction Conditions

In regard to the conditions for the reaction between the polyester polyol, the polyether diol, the polyol containing an anionic group and the organic polyisocyanate compound, those conventionally used reaction conditions can be used without particular limitation.

Besides the preferred terephthalate containing polyester polyols also a mixture of different polymeric polyols can be used to adjust the physical properties, adhesion, mechanical performance, ect. Examples are e.g. polycarbonate polyols, polyether polyols, polyacrylate polyols, aliphatic polyester polyols, polyolefin polyols or other polymeric polyols. Examples of polycarbonate polyols are e.g. Oxymer C112, Oxymer M112 (available via Perstorp), Kuraray polyol C-2050, C-2090, C-1090 (available from Kuraray), Converge HMA-1 and Converge HMA-1 (available from Novomer Inc.), Duranol T6002, T6001, T5652, T5651, T5650J, T4672, T4671, T4692 and T4691 (available from Asahi kasei). Additional aliphatic polyester polyols, are e.g. regular (semi)crystalline or amorphous grades, e.g. based on hexane diol adipates (e.g. Dynacoll 7372 from Evonik) but also polyester polyols based on natural products such as polyester polyols made by using dimer acid or dimer diols (e.g. trade name Priplast from Croda), examples are Priplast 3192 and Priplast 1838. The raw material used to prepare certain Priplast grades, i.e. dimer diols with trade name Pripol can also be used as monomer in the PU synthesis to modify the physical properties and adhesive properties.

In the reaction between the polyester polyol and the organic polyisocyanate compound, if necessary, a diol with Mw equal to or less than 400 can be used. Examples of suitable diols are: ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. 1,4-butane diol is most preferred.

In the polyurethane synthesis different high molar mass polyols and low molecular weight diols can be reacted, besides the polyether diols used for stabilization of the polyurethane dispersion. In the procedure used the stabilizing polyols and the polyester polyol (Mw>400 g/mol) are reacted with in excess of isocyanate. This enables a good conversion of the reaction. Depending on the molecular weight and the copolymer composition, the polyester polyol, may have a poor solubility in the reaction solvent (e.g. acetone). Also the polyol with the anionic group has a poor solubility in acetone. After reacting using an excess of isocyanate, the excess is compensated to a NCO/OH molar ratio by addition of a low molecular weight diol, which would lead to a polyurethane resin with very low amount of residual isocyanate. In case some residual isocyanate is present some urea bonds could be formed. Examples of suitable diols are given above.

So in the reaction conditions used a pre-condensation step with NCO/OH-ratio >1 and a chain extension step at NCO/OH-ratio=1.0 can be distinguished. Instead of using a 2-step process, one could use also a one-step or semi-continuous process. In the 2-step process, when using a high NCO/OH ratio more low molar mass diol (chain extender) is added and the weight ratio of the polyester polyol is reduced. In order to obtain the desired properties, the amount of polyester polyol as compared to low molar mass diols should be considerably higher, i.e. at least 50 wt. %. Surprisingly it was found that upon using high NCO/OH ratios in the pre-condensation step this resulted into polyurethane dispersions with poorer colloidal stability because of more coarse particles leading to an ink jet ink having poorer filterability. Reacting at a higher NCO/OH ratio in the pre-condensation step will lead also to a higher content of urethane units, which are able to form hydrogen bonds. When keeping the type of polyester polyol constant and also the chain extender, reacting at an NCO/OH ratio more close to NCO/OH=1.0, leads to better colloidal stability and better filtration properties of the formulated ink jet ink. Consequently when the NCO/OH ratio and the amount of urethane bonds play an important role, also the molecular weight of the polyester polyol and the low molar mass diol plays a role. In the most examples only one polyester polyol is used and only one low molar mass diol. When using mixtures of diols one can easily calculate the number average molecular weight which will affect the NCO/OH ratio.

It was found that there was a direct correlation between the filterability and the NCO/OH ratio and consequently the weight ratio of polyester polyol/low molar mass diol. An even better correlation was found when this weight ratio was corrected for the molecular weight of the polyester polyol and the low molar mass diol. As an example the corrected polyol ratio is calculated for 2 polyester polyols which are reacted with the low molar mass diol 1,4-butane diol. First the weight ratio is calculated, defined by the weight of the monomers weighed for the polyurethane synthesis. The correction for the (number average) molar mass of the in the polyol ratio is calculated as follows:

The Corrected polyol ratio=((number average molecular weight low molar mass diols)×(weight ratio polyester polyol/low molar mass diol))/(number average molecular weight polymeric polyol).

In the formula for the corrected polyol ratio, all polymeric polyols and low molar mass diols are taken into account except the polyether diol and the polyol containing the anionic group.

The number average molecular weight is calculated from the hydroxyl content, i.e. (2×1000)/((mg KOH/gram)/56.11).

Examples of the organic solvent used for the reaction between the polyester polyol and the organic polyisocyanate compound here include ketones such as acetone and methyl ethyl ketone, ethers such as tetrahydrofuran and dioxane, acetates such as ethyl acetate and butyl acetate, nitriles such as acetonitrile, and amides such as dimethyl formamide, N-methylpyrrolidone and N-ethylpyrrolidone. These may be used singly or in combinations of two or more.

Using higher molecular weight polyols than Ymer120N will give more phase separation, providing a better water dispersibility. However for the making of the polyurethane resin, it is more difficult to dissolve these polyols in de organic solvent, e.g. acetone. This can be overcome by using a co-solvent during the polycondensation reaction. A preferred co-solvent is 2-pyrolidon or N-methylpyrrolidone.

The ink composition of the invention contains the polyurethane resin as an essential component. Therefore, the polyurethane resin is preferably dispersed in water to obtain an aqueous dispersion of the polyurethane resin. Every dispersing technology suitable for preparing an aqueous dispersion may be used.

The mass ratio of the polyurethane resin to the colorant that will be described later is preferably between 2 and 5. A ratio smaller than 2 results in a decrease of physical properties (dry and wet scratch resistance), a ratio higher than 5 results is a decrease of the jetting properties.

B. Ink Jet Ink Composition

The inkjet ink according to the present invention contains the polyurethane resin as described in § A, water and a water-soluble organic solvent. Additional components are given below. The ink jet ink according to the present invention, without a colorant is also suitable as a varnish or a pre-treatment liquid. The pre-treatment liquid is preferably to be used on porous substrates. When to be used as varnish or pre-treatment liquid, a (wt.)% equal to or lower than 20 wt. % of the polyurethane resin of the invention is incorporated in the ink jet ink formulation. The varnish containing the polyurethane resin of the invention increases gloss and scratch resistance of printed images. The pre-treatment liquid can also be applied onto the substrate by means of a coating technique, a spraying technique and a valve-jetting technique. In case these application techniques are used for the pre-treatment liquid, the content of the polyurethane resin in the liquid is equal to or less than 30 wt. %.

B.1. Colorant

The inkjet ink according to the present invention contains preferably a colorant. Preferably the colorant is a pigment. As the pigment, any inorganic pigment or organic pigment can be used.

As the inorganic pigment titanium oxide, iron oxide, calcium carbonate, barium sulfate, aluminium hydroxide, Barium Yellow, Cadmium Red, and Chrome Yellow, carbon black can be used. Other suitable inorganic pigments are disclosed in [072-075] from WO2009/053302.

Among them, carbon black (Pigment Black 7) can be preferably used, and examples thereof include carbon blacks available from Cabot Corporation under trademarks Regal, Black Pearls, Elftex, Monarch, Regal, Mogul and Vulcan (for example, Black Pearls 2000, 1400, 1300, 1100, 1000, 900, 880, 800, 700 and 570, Black Pearls L, Elftex 8, Monarch 1400, 1300, 1100, 1000, 900, 880, 800 and 700, Mogul L, Regal 330, 400 and 660, and Vulcan P), and SENSIJET BlackSDP100 (SENSIENT), SENSIJET Black-SDP1000 (SENSIENT) and SENSIJET BlackSDP2000 (SENSIENT).

Examples of the organic pigment include azo pigments (including azo lakes, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye-type chelates and acidic dye-type chelates), nitro pigments, nitroso pigments, and aniline black. Specific examples include C.I. Pigment Yellow I, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 128, 139, 150, 151, 155, 153, 180, 183, 185 and 213, C.I. Pigment Orange 5, 13, 16, 17, 36, 43 and 51, C.I. Pigment Red I, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 185, 190, 193, 209, 219 and 254, C.I. Pigment Violet I (Rhodamine Lake), 3, 5:1, 16, 19, 23 and 38, C.I. Pigment Blue I, 2, 15 (Phthalocyanine Blue), 15:1, 15:2, 15:3 (Phthalocyanine Blue), 16, 17:1, 56, 60 and 63; and C.I. Pigment Green I, 4, 7, 8, 10, 17, 18 and 36.

The method for dispersing the pigment in the ink includes a dispersing method by using a surfactant, a dispersing method by using a dispersible resin, a dispersing method by covering the surface of the pigment with a resin, and a method by introducing a hydrophilic functional group to the surface of the pigment to provide a self-dispersible pigment.

The method for dispersing the pigment in the ink can also be done by using the polyurethane resin of the invention as a dispersant. The advantage of this method, is that a better compatibility between the colour pigment and the resin is achieved in the ink, leading to an improved colloidal stability of the inkjet ink.

In particular, a self dispersible pigment is preferably used. The self-dispersible pigment having a hydrophilic functional group, may also contain an anionic functional group. Examples of the anionic functional group include —COOM, —$SO_3M$, —$PO_3HM$, —$PO_3M_2$, —$SO_3NM_2$, —NH, —$C_6H_4$—COOM, —NH—$C_6H_4$ $SO_3M$, —NH—$C_6H_4$ $PO_3HM$, —NH—$C_6H_4PO_3M_2$, —NH—$C_6H_4CONHM$ and —NH—$C_6H_4$—$SO_2NHM$ and examples of the counter ion M include an alkali metal ion and a quaternary ammonium ion, but a quaternary ammonium ion is preferable. Examples of suitable self dispersible pigments are self-dispersible pigments from Emerald and from Cabot: Cab-O-Jet 200 (K), Cab-O-Jet 250C, Cab-O-Jet 260M & 265 M, Cab-O-Jet 270 Y, are ionically stabilized, Cab-O-Jet 260 (M), Cab-O-Jet 450C, Cab-O-Jet 470Y, Cab-O-Jet 480V, Cab-O-Jet 400 (CB), Cab-O-Jet 465 M, most of them are modified by a sulfonate group.

Examples of the quaternary ammonium ion include a tetramethyl ammonium ion, a tetraethyl ammonium ion, a tetrapropyl ammonium ion, a tetrabutyl ammonium ion, a tetrapentyl ammonium ion, a benzyltrimethyl ammonium ion, a benzyltriethyl ammonium ion, and a tetrahexyl ammonium ion. Among them, a tetraethyl ammonium ion, a tetrabutyl ammonium ion, and benzyltrimethyl ammonium ion are preferable, and a tetrabutyl ammonium ion is particularly preferable.

The self dispersible pigment is preferably a modified pigment which can be modified by a carboxylate or sulfonate group. Other possible groups are a bis-phosphonic acid group or a bis-phosphonic acid salt group, or both thereof.

B.2. Water Soluble Organic Solvent

The inkjet ink of the invention contains, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1, 3-propanediol, 2-methyl-1, 3-propanediol, 1,2-pentanediol, 2,4-pentanediol, 1,5-pentanediol, 1,6-hexanediol, 2-ethyl-1, 3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2, 4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous ink jet ink is preferably 20% by mass or more and less than 70% by mass. If the content is less than 20% by mass, reliable jetting might be difficult, due to for instance a viscosity mismatch between ink and head. If the content exceeds 70% by mass, the ink looses its water based, more green character.

The water-soluble organic solvent is preferably a mixture of organic solvents comprising 3-methoxy-3-methyl-1-butanol. This organic solvent increases the viscosity of the ink leading to a possible ink formulation with less co-solvent. As 3-methoxy-3-methyl-1-butanol is volatile it also reduces the ink drying time.

B.3. Humectant

The ink jet ink of the invention may contain at least one humectant to prevent the clogging of nozzles in an inkjet print head, due to its ability to slow down the evaporation rate of the inkjet ink, especially the water in the inkjet printing liquid. The humectant is an organic solvent having a higher boiling point than water.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol or a derivative or isomer of 2-pyrolidone.

The humectant is preferably added to the inkjet printing liquid in an amount of 0.1 to 20 wt % based on the total weight of the inkjet printing liquid.

B.4. Surfactant

In the ink of the present invention, a surfactant may be added in order to ensure wettability onto the substrate. The amount of the surfactant added is preferably 0.1 wt. % to 5 wt. % as an active component in the ink.

If the amount added is below 0.1% by mass, wettability onto the substrate is not sufficient and causes degradation in image quality and might cause jetting issues. If the amount exceeds 5% by mass, the ink easily foams to cause non-discharge. The surfactant that can be used is not particularly limited as long as it satisfies the above limitation.

While any of an amphoteric surfactant, a non-ionic surfactant, and an anionic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability of the colour material and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

C. Ink Jet Recording Method

The inkjet recording method of the present invention may include at least a step of heating the substrate and an ink jetting step. The method further includes a heating/drying step and other steps appropriately selected, if necessary.

The ink jet ink of the present invention is suitable for ink jet printing on different substrates, porous and non-porous ones. Porous substrates include paper, card board, white lined chipboard, corrugated board, packaging board, wood, ceramics, stone, leather and textile. Non-porous substrates include metal, synthetic leather, glass, polypropylene, polyvinylchloride, PET, PMMA, polycarbonate, polyamide, polystyrene or co-polymers thereof. The heating step of the substrate is particularly advantageously when non-porous substrates are used in the inkjet recording method of the invention.

In some instances, a pre-treatment liquid may be applied to the substrate prior to printing the inkjet ink onto the substrate. Pre-treatment liquids are preferably applied on porous substrates.

The heating temperature in the step of heating the substrate can be changed depending on the type and amount of the water-soluble organic solvent contained in the ink and the minimum film formation temperature of the polyurethane resin added, and can be further changed depending on the type of a substrate for printing. Especially, heating of non-porous substrates results in an improved image quality in combination with high printing speeds. The heating temperature is generally controlled to 80° C. or lower to prevent deformation of the substrate, but is preferably raised in the range of 40° C. to 80° C.

The heating temperature after printing is preferably high in terms of drying properties and film formation temperature (to avoid set off during roll up or stacking after printing), but a too high heating temperature is not preferable because the substrate for printing can be damaged and an ink head can also be warmed to a temperature outside its optimal working range.

With respect to such use of a heating apparatus, one or more among many known heating equipments can be used. Examples include equipments for forced-air heating, radiation heating such as IR-radiation, conduction heating, high-frequency drying, and microwave drying, and these can be used singly or in combinations of two or more. Preferably, the heating of the substrate is by contacting the substrate with a heated metal plate. Radiation heating using IR-radiation include SWIR (Short wave infra red radiation), NIR (Near-infra red radiation) and CIR (Carbon infra red radiation).

While the ink of the present invention can be used for printing a high-quality image, the substrate is advantageously heated before and/or during jetting of the ink in order to form an image having a higher image quality (e.g. coalescence) and high scratch resistance and adhesiveness and in order to achieve high printing speeds.

The ink ejection step is a step of applying a stimulus to the ink constituting the present invention to thereby allow the ink to be ejected, forming an image. An ink ejection unit is a unit for applying a stimulus to the ink constituting the present invention to thereby allow the ink to be ejected, forming an image. The ink ejection unit is not particularly limited, and can be appropriately selected depending on the object. Examples thereof include various recording heads (ink discharge heads), and in particular, one having a head having a plurality of nozzle rows and a sub-tank for accommodating a liquid supplied from a tank for liquid storage to supply the liquid to the head is preferable.

The stimulus can be generated by a stimulus-generating unit, the stimulus is not particularly limited and can be appropriately selected depending on the object, and examples thereof include heat (temperature), pressure, vibration, and light. These may be used singly or in combinations of two or more. Among them, heat and pressure are suitable.

Herein, examples of the stimulus-generating unit include a heating apparatus, a pressurizing apparatus, a piezoelectric element, a vibration-generating apparatus, an ultrasonic wave oscillator, and a light. Specific examples include piezoelectric actuators such as a piezoelectric element, a thermal actuator utilizing a phase transition of liquid due to film boiling using an electro-thermal conversion element such as a heat resistor, a shape memory alloy actuator using a metal phase transition due to change in temperature, and a static actuator using an electrostatic force.

The mode of ejection of the ink is not particularly limited and is different depending on the type of the stimulus, and when the stimulus is "heat", examples of the mode include a method in which heat energy corresponding to a recording signal is applied to the ink in a recording head using a thermal head or the like to thereby allow the ink to generate air bubbles, and the pressure of the air bubbles allows the ink to be discharged and jetted as droplets from a nozzle hole of the recording head. In addition, when the stimulus is "pressure", examples of the mode include a method in which a voltage is applied to a piezoelectric element adhered to a position called pressure chamber located in an ink passage in a recording head, to deflect the piezoelectric element and to decrease the volume of the pressure chamber, discharging and jetting the ink as droplets from a nozzle hole of the recording head.

Among them, preferable is the method in which a voltage is applied to a piezo element to allow the ink for recording to be ejected. Since a piezo system does not generate heat, this is efficient for allowing a resin particle-containing ink to be ejected, and is an effective method that causes less nozzle clogging.

In the inkjet recording method of the present invention, it is preferable that heating and drying be further performed even after printing.

EXAMPLES

Measurement Methods

1. Viscosity

The viscosity of the inks was measured at 32° C. using a "Robotic Viscometer Type VISCObot" from CAMBRIDGE APPLIED SYSTEMS.

2. Stability

Ink stability was evaluated numerically and visually. If the relative viscosity of the ink increases more than 40% after being stored for 2 weeks at 60° C. the ink is called unstable. If the ink solidifies or if phase separation can be seen the ink is called unstable.

3. Scratch Resistance

Ink formulations were coated with an automated bar coater using a 10 μm spiral bar head on a MetaMark MD5-100. After drying the film at 60° C. in an oven, it could be further evaluated. In case of dry scratch resistance film was scratched with a pen with a tungsten carbide tip and ink delamination of the scratch was evaluated according the criteria in Table 1. In case of wet scratch resistance the dried coating was soaked in water at room temperature. After 10 minutes the pieces are removed from the water and placed on an absorbent tissue just before scratching with a tungsten carbide tipped pen. Next the scratch is rubbed once with a nitrile substrate and the level of delamination was quantified according the criteria in Table 2.

TABLE 1

| Delamination by dry scratching | Score |
| --- | --- |
| No or very limited trace of scratching | 1 |
| Slight delamination of scratch/substrate slightly visible | 2 |
| Strong delamination of scratch/substrate clearly visible | 3 |

TABLE 2

| Delamination after wet scratching | Score |
| --- | --- |
| No or very limited trace of scratching | 1 |
| Slight delamination around scratch/substrate slightly visible | 2 |
| Strong delamination around scratch/substrate clearly visible | 3 |

4. Solvent Resistance

Ink formulations were coated and dried as described for the scratch resistance measurement method. The solvent resistance was tested by means of wiping the dried film with a swab soaked in isopropanol. The level of solvent resistance was quantified according the criteria in Table 3.

TABLE 3

| Level of solvent attack | Score |
| --- | --- |
| No or very limited influence on film appearance | 1 |
| Slight influence on film appearance/substrate slightly visible | 2 |
| Strong influence on film appearance/substrate strongly visible | 3 |

5. Filterability

Filterability was evaluated by measuring the time to filter 12 ml (called t2) of ink using a 1 μm Chromafil GF-100/15 filter from Macherey-Nagel.

6. Image Quality

Test images were printed with a Mimaki JV400 LX engine, the 8 ink cartridges were filled with the ink jet inks of the examples. The images were printed unidirectional in 16 passes with a resolution of 1200×1200 dpi in the absence of colour adjustment and colour matching. The printed and dried image was evaluated visually based on the presence of coalescence, mainly seen in secondary colours, Red, Green and Blue. The evaluation criteria and the corresponding scores are shown in Table 4.

TABLE 4

| Image quality | Score |
| --- | --- |
| No or only traces of coalescence visible | 1 |
| Limited amount of coalescence visible | 2 |
| Strong coalescence visible | 3 |

Materials

All materials used in the following examples were readily available from standard sources such as Sigma-Aldrich (Belgium) and Acros (Belgium) unless otherwise specified. The water used was demineralised water.

Acetone is acetone p.a. supplied by VWR International

Vylon 220 is a polyester polyol containing terephthalic ester and isophthalic ester units obtained from Toyobo Dynacoll 7150 is a polyester polyol containing terephthalic ester and isophthalic ester units supplied by Evonik Dynacoll 3781 is an aliphatic polyester polyol based on hexane diol and adipic acid obtained from Evonik Ymer N120 is 1,3 diol polyether supplied by Perstorp Elitel XP1402 from Unitika Ltd, Dusseldorf, Germany DBTL is dibutyl tin laurate (KEVER-KAT DBTL 162) supplied by Brenntag DMPA is dimethylol propionic acid supplied by Geo Chemicals IPDI is a Vestanat IPDI, isocyanate supplied by Evonik BD is 1,4-butane diol supplied by Acros Triethylamine is triethylamine supplied by Acros PU-x is an aqueous dispersion of a polyurethane resin COL-1 is a commercial cyan dispersion supplied by DIAMOND DISPERSIONS LTD, available under the trade name Diamond D75C COL-2 is a commercial magenta dispersion supplied by Cabot Corporation, available under the trade name Cab-O-Jet 465 M COL-3 is a commercial yellow dispersion supplied by DIAMOND DISPERSIONS LTD, available under the trade name Diamond D75Y COL-4 is a commercial black dispersion supplied by DIAMOND DISPERSIONS LTD, available under the trade name Diamond 75K COL-5 is a commercial cyan dispersion supplied by Cabot Corporation, available under the trade name Cab-O-Jet 450C COL-6 is a commercial yellow dispersion supplied by Cabot Corporation, available under the trade name Cab-O-Jet 470 Y COL-7 is a commercial black dispersion supplied by Cabot Corporation, available under the trade name Cab-O-Jet 300

PYR is 2-pyrrolidone.

HD is 1,2-hexanediol

SURF-1 is Thetawet™ FS8150 a fluoro-based surfactant from NEOCHEM GMBH

SURF-2 is Capstone FS3100, a surfactant from Dupont

SURF-3 is Tego Twin 4000, a surfactant from Evonik Industries

MMB is 3-methoxy-3-methyl-1-butanol

TPM is tripropylene Glycol Methyl Ether from Dow

SUBST is a PVC based substrate of 225 micron thickness also known as MetaMark MD5-100

SUBST2 is a PET based substrate known as Synaps OM230 from Agfa.

Polyurethane Resin Dispersions

PU-1

In a 12 litre jacketed reactor equipped with a coiled condenser 2400.81 g of Vylon 220 was added and 3323.1 g of acetone. The reactor was stirred until all polyester polyol was dissolved, during approximately one hour at room temperature. Ymer N120 was heated to 80° C. in order to become liquid. In an Erlenmeyer of 2 litres, 861.52 g of acetone and 352.41 g of Ymer N120 was added. The mixture was stirred using a magnetic stirrer, until a homogeneous solution was obtained. In an Erlenmeyer of 500 ml the catalyst solution was prepared by weighing 23.17 g of DBTL and 208.55 g of Acetone. To the dissolved polyester polyol 50.43 g of DMPA was added. Subsequently the Ymer N120 solution was added. The Erlenmeyer was flushed with 85.4 g of acetone. The catalyst solution was added and also flushed with 85.4 g of acetone. The reaction mixture at room temperature was slightly turbid and heated to 55° C. Upon heating and stirring the reaction mixture becomes clear. As 55° C. was reached 609.17 g of IPDI was added drop wise via an addition funnel with pressure equalization arm during 120 minutes. The amount isocyanate added was in excess towards the hydroxyl content, NCO/OH=1.53. After reacting during 120 minutes at 55° C., 85.58 g of BD. The reaction mixture was cooled to 45° C., in order to avoid evaporation of acetone. The reaction mixture was then allowed to react overnight during 20 hour at 44° C. in order to reach full conversion. After stirring during 20 hours overnight the reaction mixture was heated to 55° C. and stirred during 30 minutes. Afterwards the reaction mixture was cooled to room temperature. The concentration was determined by taken 1 g and drying 120 minutes at 70° C. The concentration determined was 43.82%.

The dispersion of the obtained polyurethane resin was made in a stainless steel vessel of 12 litres having a diameter of 22.5 cm. and using Disperlux equipment equipped with a 12.5 cm diameter dissolver stirrer. To the vessel 4000 g of the polyurethane solution in acetone was added. The solution was slowly stirred at 930 r.p.m. and 19.4 g of Triethylamine was added during 5 minutes and stirred during 30 minutes in order to neutralize the carboxylic acid groups of the DMPA units in the polymer. Afterwards 3236.2 g of water was added during 20 minutes. The dissolver stirrer was set at 1965 r.p.m. After the addition of 30% of the water, the rotation speed of the stirrer was reduced to 930 r.p.m. After all the water was added the mixture was stirred for still 5 minutes. The prepared dispersion in acetone/water was added to a 12 litre jacketed Radleys reactor heated at a jacket temperature of 40° C. and stirred at 200 r.p.m. The acetone present in the dispersion was distilled off going to a pressure of 60 mBar at a temperature of 36° C. After cooling to room temperature the solids content was determined by taken 1 g and drying at 130° C. during 90 minutes. The solids content obtained was 35.86 wt. %. The measured pH was 7.90. The particle size according to a Zetasizer measurement is 136 nm.

PU-2

In a 500 ml 3 necked round bottom flask equipped with a coiled condenser and stirrer, 2.34 g of DMPA was added. The high molar mass polyester polyol was dissolved one day in advance in an Erlenmeyer by adding 201.86 g of acetone to 112.42 g of Vylon 220. This Erlenmeyer was kept at 45° C. until a clear solution was obtained. In this reaction no Ymer N120 was used. The dissolved polyester polyol mixture was cooled to room temperature and subsequently added to the DMPA powder present in the 500 ml 3 necked round bottom flask. 1.07 g of DBTL was diluted in 9.67 g of acetone and also added to the polyol mixture. Then the reactor was heated to 54° C. during 35 minutes, allowing the DMPA to dissolve. Subsequently the isocyanate was added drop wise via an addition funnel with pressure equalization arm during 20 minutes. For this experiment 43.41 g of IPDI was used. The amount isocyanate added was an excess towards the hydroxyl amount of NCO/OH=1.53). The reaction was allowed to take place during 2 hours at 54° C. Afterwards a chain extender was added to compensate for the excess of isocyanate, i.e. 6.10 g BD (NCO/OH=1). The reaction mixture was cooled to 44° C., in order to avoid evaporation of acetone. The reaction mixture was then allowed to react overnight during 20 hour at 44° C. s in order to reach full conversion. Then 1.74 g of triethylamine was added to neutralize the carboxylic acid groups and the reaction mixture was heated until 52° C. during 30 minutes. When the temperature reaches 52° C., the mixture was cooled to room temperature.

Subsequently the water based dispersion of the obtained polyurethane resin was made using Disperlux equipment adding water during high shear mixing. For the dispersion step 353.57 g of the neutralized solution was put in a stainless steel vessel. Under stirring at 900 r.p.m. using a 9 cm diameter dissolver stirrer 289.67 g of water was added during 20 minutes. The acetone in the obtained dispersion was evaporated on a rotary evaporator. In order to avoid foaming the evaporation was started at a lower vacuum level. The evaporation was stopped when also water was evaporating at a pressure of 60 mbar and a 40° C. heating bath. Based on the weight the concentration was corrected by adding water to 35%. Upon collecting the product in a flask and allowing it to stand for some time, it was noticed that the product was not stable and showed severe coagulation. The product could therefore not be used for ink formulations.

PU-3

For the polyester urethane synthesis a 500 ml 3 necked round bottom flask equipped with a coiled condenser and stirrer was used. For this reaction no DMPA was used. The high molar mass polyester polyol was dissolved one day in advance in an Erlenmeyer by adding 201.86 g of acetone to 117.40 g of Vylon 220. This Erlenmeyer was kept at 45 C until a clear solution was obtained. 17.23 g of Ymer N120 was heated to 80° C. in order to become liquid and was to the polyol solution. Then the mixture of polyols (Ymer+polyester polyol) was cooled to room temperature. The polyol mixture was subsequently added to the 500 ml 3 necked round bottom flask. 1.07 g of DBTL was diluted in 9.67 g of acetone and also added to the polyol mixture. Then the reactor was heated to 54° C. during 35 minutes. Subsequently the isocyanate was added drop wise via an addition funnel with pressure equalization arm during 20 minutes. For this experiment 23.54 g of IPDI was used. The amount isocyanate added was an excess towards the hydroxyl amount, i.e. NCO/OH=1.53. The reaction was allowed to take place during 2 hours at 54° C. Afterwards 3.31 g of BD as a chain extender was added to compensate for the excess of isocyanate (NCO/OH=1). The reaction mixture was cooled to 44° C., in order to avoid evaporation of acetone.

The reaction mixture was then allowed to react overnight during 20 hour at 44° C. s in order to reach full conversion. No triethylamine was added since no DMPA was used.

Subsequently the water based dispersion of the obtained polyurethane resin was made the same way as described for PU-2, but with 337.24 g of the reaction mixture containing the obtained polyurethane resin and 272.13 g of water. The exact solid content was determined by drying 1 gram of solution on an aluminium dish at 130° C. during 120 minutes. The solid content obtained was 35.88 wt. %. The pH is 6.57. The particle size according to a Zetasizer measurement is 176 nm.

PU-4

In a 500 ml 3 necked round bottom flask equipped with a coiled condenser and stirrer, 2.34 g of DMPA was added. The high molar mass polyester polyol was dissolved one day in advance in an Erlenmeyer by adding 201.45 g of acetone to 51.67 g of Vylon 220. This Erlenmeyer was kept at 45° C. until a clear solution was obtained. 67.80 g Ymer N120 was heated to 80° C. in order to become liquid and added warm to the polyol solution. Then the mixture of polyols (Ymer+polyester polyol) was cooled to room temperature. The polyol mixture was subsequently added to the DMPA powder present in the 500 ml 3 necked round bottom flask. 1.07 g of DBTL was diluted in 9.67 g of acetone and also added to the polyol mixture. Then the reactor was heated to 54° C. during 35 minutes, allowing the DMPA to dissolve. Subsequently the isocyanate was added drop wise via an addition funnel with pressure equalization arm during 60 minutes. For this experiment 25.89 g of IPDI was used. The amount isocyanate added was an excess towards the hydroxyl amount, i.e. NCO/OH=1.53. The reaction was allowed to take place during 2 hours at 54° C. Afterwards 5.11 g of BD as a chain extender was added to compensate for the excess of isocyanate (NCO/OH=1). The reaction mixture was cooled to 44° C., in order to avoid evaporation of acetone. The reaction mixture was then allowed to react overnight during 20 hour at 44° C. s in order to reach full conversion. Then 1.74 g of triethylamine was added to neutralize the carboxylic acid groups and the reaction mixture was heated until 52° C. during 30 minutes. When the temperature reaches 52° C., the mixture was cooled to room temperature.

Subsequently the dispersion of the obtained polyurethane resin was made the same way as described for PU-2, but with 339.54 g of the reaction mixture containing the obtained polyurethane resin and 277.39 g of water. The exact solid content was is determined the same way as for PU-3. The solid content obtained was 35.92 wt. %. The measure pH was 7.32. The particle size according to a Zetasizer measurement shows a bimodal distribution: 34 nm (81.6%) and 330 nm (14.3%).

PU-5

The polyurethane resin to be prepared for the aqueous dispersion PU-5 is obtained the same way as described in PU-4, but with 14.38 g of DMPA, 79.67 of Vylon 220 and 11.69 g of Ymer N120. The isocyanate was added drop wise via an addition funnel with pressure equalization arm during 30 minutes instead of 60 minutes. The amount isocyanate added was an excess towards the hydroxyl amount, i.e. NCO/OH=1.53. 7.36 g of BD as a chain extender was used to compensate for the excess of isocyanate (NCO/OH=1) and 10.85 g of triethylamine was used to neutralize the carboxylic acid groups.

Subsequently the dispersion of the obtained polyurethane resin was made the same way as described for PU-2, but with 358.56 g of the reaction mixture containing the obtained polyurethane resin and 303.79 g of water. The exact solid content was is determined the same way as for PU-3. The solid content obtained was 35.18 wt. %. The measured pH was 7.79. The particle size according to a Zetasizer measurement shows a bimodal distribution: 25 nm (95.4%) and 4652 nm (4.6%).

PU-6

The polyurethane resin to be prepared for the aqueous dispersion PU-6 is obtained the same way as described in PU-4, but with 2.34 g of DMPA, 120.63 of Vylon 220, 8.25 g of Ymer N120 and 26.96 g of IPDI. The isocyanate was added drop wise via an addition funnel with pressure equalization arm during 20 minutes instead of 60 minutes. The amount isocyanate added was an excess towards the hydroxyl amount, i.e. NCO/OH=1.53. 3.79 g of BD as a chain extender was used to compensate for the excess of isocyanate (NCO/OH=1) and 1.75 g of triethylamine was used to neutralize the carboxylic acid groups.

Subsequently the dispersion of the obtained polyurethane resin was made the same way as described for PU-2, but with 349.31 g of the reaction mixture containing the obtained polyurethane resin and 284.07 g of water. The exact solid content was is determined the same way as for PU-3. The solid content obtained was 34.83 wt. %. The measured pH was 7.90. The particle size according to a Zetasizer measurement is 245 nm.

PU-7

The polyurethane resin to be prepared for the aqueous dispersion PU-7 is obtained the same way as described in PU-4, but with 2.34 g of DMPA, 125.38 g of Vylon 220, 4.14 g of Ymer N120 and 26.31 g of IPDI. The isocyanate was added drop wise via an addition funnel with pressure equalization arm during 20 minutes instead of 60 minutes. The amount isocyanate added was an excess towards the hydroxyl amount, i.e. NCO/OH=1.53. 3.79 g of BD as a chain extender was used to compensate for the excess of isocyanate (NCO/OH=1) and 1.76 g of triethylamine was used to neutralize the carboxylic acid groups.

Subsequently the dispersion of the obtained polyurethane resin was made the same way as described for PU-2, but with 346.51 g of the reaction mixture containing the obtained polyurethane resin and 281.72 g of water. The exact solid content was is determined the same way as for PU-3. The solid content obtained was 37.77 wt. %. The measured pH was 7.79. The particle size according to a Zetasizer measurement shows a bimodal distribution: 488 nm (94%) and 94 nm (6%).

PU-8

The polyurethane resin to be prepared for the aqueous dispersion PU-8 is obtained the same way as described in PU-4, but with 2.34 g of DMPA, 116.37 g of Dynacoll 7381 instead of Vylon 220, 17.08 g of Ymer N120 and 22.38 g of IPDI. The isocyanate was added drop wise via an addition funnel with pressure equalization arm during 20 minutes instead of 60 minutes. The amount isocyanate added was an excess towards the hydroxyl amount, i.e. NCO/OH=1.53. 3.14 g of BD as a chain extender was used to compensate for the excess of isocyanate (NCO/OH=1) and 1.75 g of triethylamine was used to neutralize the carboxylic acid groups.

Subsequently the dispersion of the obtained polyurethane resin was made the same way as described for PU-2, but with 340.74 g of the reaction mixture containing the obtained polyurethane resin and 276.5 g of water. The exact solid content was is determined the same way as for PU-3. The solid content obtained was 35.11 wt. %. The measured pH was 7.62. The particle size according to a Zetasizer measurement is 104 nm.

PU-9

The polyurethane resin to be prepared for the aqueous dispersion PU-9 is obtained the same way as described in PU-4, but with 2.34 g of DMPA, 113.3 g of Dynacoll 7150 instead of Vylon 220 and 16.63 g of Ymer N120. The isocyanate was added drop wise via an addition funnel with pressure equalization arm during 20 minutes instead of 60 minutes. The amount isocyanate added was an excess towards the hydroxyl amount, i.e. NCO/OH=1.53. 3.64 g of BD as a chain extender was used to compensate for the excess of isocyanate (NCO/OH=1) and 1.76 g of triethylamine was used to neutralize the carboxylic acid groups.

Subsequently the dispersion of the obtained polyurethane resin was made the same way as described for PU-2, but with 347.0 g of the reaction mixture containing the obtained polyurethane resin and 281.95 g of water. The exact solid content was is determined the same way as for PU-3. The solid content obtained was 35.87 wt. %. The measured pH was 7.82. The particle size according to a Zetasizer measurement is 131 nm.

PU-10

The polyurethane resin to be prepared for the aqueous dispersion PU-10 is obtained the same way as described in PU-4, but with 125.48 g of Elitel XP1402, 18.42 g of Ymer N120 and 11.93 g of IPDI. The isocyanate was added drop wise via an addition funnel with pressure equalization arm during 20 minutes instead of 60 minutes. The amount isocyanate added was an excess towards the hydroxyl amount, i.e. NCO/OH=1.05. 0.23 g of BD as a chain extender was used to compensate for the excess of isocyanate (NCO/OH=1) and 1.76 g of triethylamine was used to neutralize the carboxylic acid groups.

Subsequently the dispersion of the obtained polyurethane resin was made the same way as described for PU-2, but with 338.02 g of the reaction mixture containing the obtained polyurethane resin and 271.53 g of water. The exact solid content was is determined the same way as for PU-3. The solid content obtained was 35.53 wt. %. The measured pH was 7.63. The particle size according to a Zetasizer measurement: 118 nm.

PU-11

The polyurethane resin to be prepared for the aqueous dispersion PU-11 is obtained the same way as described in PU-4, but with 121.07 g of Elitel XP1402, 17.77 g of Ymer N120 and 16.99 g of IPDI. The isocyanate was added drop wise via an addition funnel with pressure equalization arm during 20 minutes instead of 60 minutes. The amount isocyanate added was an excess towards the hydroxyl amount, i.e. NCO/OH=1.53. 1.46 g of BD as a chain extender was used to compensate for the excess of isocyanate (NCO/OH=1) and 1.74 g of triethylamine was used to neutralize the carboxylic acid groups.

Subsequently the dispersion of the obtained polyurethane resin was made the same way as described for PU-2, but with 334.92 g of the reaction mixture containing the obtained polyurethane resin and 271.07 g of water. The exact solid content was is determined the same way as for PU-3. The solid content obtained was 36.76 wt. %. The measured pH was 7.40. The particle size according to a Zetasizer measurement: 130 nm.

PU-12

The polyurethane resin to be prepared for the aqueous dispersion PU-12 is obtained the same way as described in PU-4, but with 111.55 g of Elitel XP1402, 16.37 g of Ymer N120 and 27.91 g of IPDI. The isocyanate was added drop wise via an addition funnel with pressure equalization arm during 20 minutes instead of 60 minutes. The amount isocyanate added was an excess towards the hydroxyl amount, i.e. NCO/OH=2.56. 7.05 g of BD as a chain extender was used to compensate for the excess of isocyanate (NCO/OH=1) and 1.75 g of triethylamine was used to neutralize the carboxylic acid groups.

Subsequently the dispersion of the obtained polyurethane resin was made the same way as described for PU-2, but with 343.90 g of the reaction mixture containing the obtained polyurethane resin and 282.76 g of water. The exact solid content was is determined the same way as for PU-3. The solid content obtained was 34.91 wt. %. The measured pH was 5.82. The particle size according to a Zetasizer measurement: 138 nm.

Example 1

This example illustrates the need for a polyurethane resin obtained by reacting a polyester polyol, a polyether diol and a polyol containing an anionic group in order to assure sufficient ink stability and at the same time excellent physical properties of the dried ink on a vinyl substrate (SUBST). The presence of a polyether diol and a polyol containing an anionic group during the reaction implies that these compounds are built in the PU-resin.

Preparation of Cyan Inkjet Inks

Table 5 shows the content of the anionic group and the content of the polyether diol in the polyurethane resin. Both compounds are incorporated to assure the stabilization of the resins in the ink jet ink, more particularly in the Cyan inks. Polyurethane resin dispersions, PU-1 to PU-7 are based on polyurethane resins obtained with the same polyester polyol Vylon 220, PU-9 is based on a polyol having a larger molar mass Dynacoll 7150. PU 1, PU-4 to PU-7 and PU-9 are PU resins which were obtained by reacting an polyester polyol, obtained by reacting an aromatic polycarboxylic acid and a polyol with a polyether diol, a polyol containing an anionic group and a polyisocyanate.

TABLE 5

| PU resin | INV/COMP | Content of the anionic group (COO−) (wt. %) | Content of the polyether diol (wt. %) |
|---|---|---|---|
| PU-1 | INV | 0.47 | 10.07 |
| PU-2 | COMP | 0.47 | 0 |
| PU-3 | COMP | 0 | 10.67 |
| PU-4 | INV | 0.47 | 40.52 |
| PU-5 | INV | 2.85 | 7.06 |
| PU-6 | INV | 0.47 | 5.09 |
| PU-7 | INV | 0.48 | 2.56 |
| PU-8 | COMP | 0.48 | 10.28 |
| PU-9 | INV | 0.48 | 10.59 |

Eight cyan inkjet inks were prepared by mixing the compounds given in Table and using the PU-resin dispersions PU-1 to PU-7 and PU-9 from Table 5. All weight percentages are relative to the total weight of the inkjet ink. The amount of the PU-resin dispersions was chosen in such a way to achieve a content of 12.0 wt. % of the solid PU-resin.

TABLE 6

| Compound | Content in wt. % |
|---|---|
| PU-resin | 12.0 |
| SURF-1 | 0.8 |

TABLE 6-continued

| Compound | Content in wt. % |
| --- | --- |
| PYR | 20.0 |
| HD | 20.0 |
| COL-1 | 20.0 |
| Water | To complete to 100% |

Evaluation and Results

Inks with different PU-resin compositions were evaluated for stability and the coatings obtained by drying these inks were evaluated for scratch resistance and solvent resistance. From Table 7 it can be seen that Cyan inkjet inks C-1 to C-7 and C-9 containing PU-resins obtained by reacting a polyester polyol, a polyether diol and a polyol containing an anionic group (hence having a steric stabilization and an electric stabilization), in accordance with the invention, were capable of delivering stable inks resulting in excellent scratch and solvent resistance, whereas an excess of polyether diol of 30 wt. % or an excess of the anionic group of 2.0 wt. % gave rise to a less good scratch and/or poor solvent resistant film after drying. The absence of a polyether diol or a polyol containing an anionic group in the reaction of the polyester polyol, and the polyisocyanate, resulted in an unstable ink.

TABLE 7

| Cyan ink-jet Ink | PU-resin dispersion | Dry scratch resistance | Wet scratch resistance | Solvent resistance | Ink stability |
| --- | --- | --- | --- | --- | --- |
| C-1 | PU-1 | 1 | 1 | 1 | OK |
| C-2 | PU-2 | — | — | — | Unstable PU-dispersion |
| C-3 | PU-3 | — | — | — | Unstable |
| C-4 | PU-4 | 3 | 3 | 3 | OK |
| C-5 | PU-5 | 1 | 3 | 2 | OK |
| C-6 | PU-6 | 1 | 1 | 1 | OK |
| C-7 | PU-7 | 1 | 1 | 1 | OK |
| C-9 | PU-9 | 1 | 1 | 1 | OK |

Example 2

This example illustrates the need for an aromatic moiety in the resin, obtained by using a polyester polyol obtained by reacting an aromatic polycarboxylic acid and a polyol in the preparation of the PU-resin in order to obtain the desired properties of a dried ink on a PVC substrate (SUBST).

Preparation of Cyan Inkjet Inks

Cyan inkjet ink C-8 was prepared according to Table 6 with the same compounds as the ink C-1 (see Example 1), but with PU-8 as the PU-resin dispersion. PU-8 is a dispersion of a polyurethane resin based on the polyester polyol Dynacoll 7381 having an aliphatic backbone and a hydroxyl number of 33.4 mg KOH/g, whereas PU-9 has an aromatic backbone and a hydroxyl number of 38-45 mg KOH/g.

Evaluation and Results

Cyan inkjet inks C-8 and C-9 were evaluated for ink stability, scratch resistance and solvent resistance. From Table it can be seen that the absence of an aromatic moiety in the polyurethane resin of PU-8 causes poor scratch resistance and inferior solvent resistance of the dried ink C-8 compared to an ink containing the dispersion PU-9 of a polyurethane resin having an aromatic moiety (C-9). Moreover, ink C-8 suffered from stability issues and became solid, briefly after the preparation of the ink. Fortunately, the coating with this ink could be performed before the solidification, so as to evaluate the properties of the dried ink. Cyan inkjet ink C-9 had a good stability.

TABLE 8

| Cyan ink-jet Ink | PU-resin dispersion | Dry scratch resistance | Wet scratch resistance | Solvent resistance | Ink stability |
| --- | --- | --- | --- | --- | --- |
| C-8 | PU-8 | 3 | 2 | 3 | Only stable during preparation and coating |
| C-9 | PU-9 | 1 | 1 | 1 | OK |

Example 3

This example illustrates the positive influence of partially replacing pyrrolidone as the water soluble organic solvent in the ink jet ink by 3-methoxy-3-methyl-1-butanol.

Preparation of Cyan Ink Jet Inks

Both ink C-10 & C-11 were prepared according to the formulas in Table 9, both based on PU-9 (see example 1), being the only difference their pyrrolidone and 3-methoxy-3-methyl-1-butanol content. The amount of the PU-resin dispersion was chosen in such a way as to achieve a content of 12.0 wt. % of the PU-resin in the ink.

TABLE 9

| Compound | C-10 Content in wt. % | C-11 Content in wt. % |
| --- | --- | --- |
| PU-9 resin | 12.0 | 12.0 |
| SURF-1 | 0.8 | 0.8 |
| PYR | 30.0 | 0 |
| HD | 10.0 | 10.0 |
| MMB | 0 | 30.0 |
| COL-1 | 20.0 | 20.0 |
| Water | To complete to 100% | To complete to 100% |

Evaluation and Results

Cyan inkjet inks C-10 and C-11 had similar solvent and scratch resistance. Partial replacement of pyrrolidone by 3-methoxy-3-methyl-1-butanol does not influence stability of the ink, but increases the viscosity as can be seen in Table 10. This allows formulating an ink jet ink with more water and a lower amount of co-solvents decreasing the environmental impact of the ink.

TABLE 10

| Cyan ink-jet ink | PU-dispersion | Ink stability | Viscosity (mPa · s) |
| --- | --- | --- | --- |
| C-10 | PU-9 | OK | 7.0 |
| C-11 | PU-9 | OK | 9.3 |

Example 4

This example illustrates the extra advantage of heating during printing with an ink containing a PU-dispersion PU-1, on the image quality. Table 11 gives the temperatures of the pre-heater setting and the heater setting during printing. The pre-heating of the substrate is located in a zone prior to the printing zone of the engine and the heating during printing of the substrate occurs where the printing is taking place (the heating zone under the ink jet print head).

TABLE 11

| Heater settings | Temperature setting of pre-heating zone (° C.) | Temperature setting of heating zone under IJ print head (° C.) | Temperature setting of dryer zone |
|---|---|---|---|
| Setting 1 | 30 | 30 | 40 |
| Setting 2 | 45 | 55 | 55 |

Preparation of Inkjet Inks

A 4 colour ink set, containing a cyan (C-12), magenta (M-1), yellow (Y-1) and black ink (K-1), was formulated according to Table 12. The amount of the PU-resin dispersion was chosen in such a way as to achieve a content of 12.0 wt. % of the PU-resin in the ink.

TABLE 12

| Compound | C-12 Content (wt. %) | M-1 Content (wt. %) | Y-1 Content (wt. %) | K-1 Content (wt. %) |
|---|---|---|---|---|
| PU-1 resin | 12.0 | 12.0 | 12.0 | 12.0 |
| SURF-1 | 0.8 | 0.8 | 0.8 | 0.8 |
| PYR | 23.0 | 23.0 | 23.0 | 23.0 |
| HD | 7.0 | 7.0 | 7.0 | 7.0 |
| TPM | 10.0 | 10.0 | 10.0 | 10.0 |
| COL-1 | 20.0 | | | |
| COL-2 | | 23.3 | | |
| COL-3 | | | 20.0 | |
| COL-4 | | | | 20.0 |
| Water | To complete to 100% | To complete to 100% | To complete to 100% | To complete to 100% |

Evaluation and Results

The 4 colour ink set (Ink C-12, M-1, Y-1 and K-1) from Table 12 was printed on SUBST using heater settings and dryer settings as displayed in Table 11. Evaluation results of the image quality of the printed test images are shown in Table 13 All inks were proved to be stable. Heating of the substrate before and during the printing process drastically improves image quality as can be seen from Table 13 and without compromising the scratch and solvent resistance of the print.

TABLE 13

| Heater setting | Image Quality |
|---|---|
| Setting 1 | 3 |
| Setting 2 | 1 |

Example 5

This example illustrates the use of the PU-resin based ink jet ink for ink jet recording on different non-porous substrates.

Preparation of Inkjet Inks

A (stable) 4 colour ink set, containing a cyan (C-13), magenta (M-2), yellow (Y-2) and black ink (K-2), was formulated according to Table 14. The amount of the PU-resin dispersions was chosen in such a way as to achieve a content of 12.0 wt. % of the PU-resin in the ink.

TABLE 14

| Compound | C-13 Content (wt. %) | M-2 Content (wt. %) | Y-2 Content (wt. %) | K-2 Content (wt. %) |
|---|---|---|---|---|
| PU-1 resin | 12.0 | 12.0 | 12.0 | 12.0 |
| SURF-2 | 0.6 | 0.6 | 0.6 | 0.6 |
| SURF-3 | 0.2 | 0.2 | 0.2 | 0.2 |
| PYR | 20.0 | 20.0 | 20.0 | 20.0 |
| HD | 20.0 | 20.0 | 20.0 | 20.0 |
| COL-5 | 20.0 | | | |
| COL-2 | | 23.3 | | |
| COL-6 | | | 20.0 | |
| COL-7 | | | | 20.0 |
| Water | To complete to 100% | To complete to 100% | To complete to 100% | To complete to 100% |

Evaluation and Results

The stable 4 colour ink set from Table 14 was printed on a PVC (SUBST) and PET (SUBST2) substrate using setting 2 for the engine heaters. Both printed images showed a very good scratch and solvent resistance having a score of 1.

Example 6

This example illustrates the influence of the polyester polyol/diol ratio in the polyurethane resins of the invention on the filterability of the ink containing these resins. The calculated Number average molecular weight for Elitel XP1402 is 8015.7 g/mol, based on the OH-content of 14 mg KOH/g). The Corrected polyol ratios for the polyurethane resins PU-10, PU-11, PU-12 having a NCO/OH ratio of 1.05, 1.53, 2.65 respectively is, based on the calculation as described in the description given in Table 15.

Preparation of Cyan Inkjet Inks

Cyan inks C-14, C-15 and C-16 were prepared according to the formulation of Table 6, using polyurethane resin dispersions with PU-10, PU-11, PU-12 as shown in Table 15.

Evaluation and Results

Filterability, measured as time to filter t2 of the cyan inks C-14, C-15 and C-16 are displayed in Table 15. It is clear from the table that a Corrected polyol ratio above a value of 0.2, positively influences the filterability of the ink jet ink.

TABLE 15

| Ink | PU resin dispersion | NCO/OH ratio | Corrected polyol ratio | t2 (s) |
|---|---|---|---|---|
| C-14 | PU-10 | 1.05 | 6.36 | 93 s |
| C-15 | PU-11 | 1.53 | 0.59 | 85 s |
| C-16 | PU-12 | 2.65 | 0.19 | >300 s |

Example 7

This example illustrates the influence of resin/pigment ratio in the ink on the (wet) scratch and solvent resistance of a dried ink on a vinyl substrate (SUBST).

Preparation of Cyan Inkjet Inks

Cyan inks C-17, C-18 and C-19 were prepared according to the formulation of Table 16, using polyurethane resin dispersion with PU-9.

TABLE 16

| Compound | ink C-17 Content (wt %) | ink C-18 Content (wt %) | ink C-19 Content (wt %) |
|---|---|---|---|
| PU-9 resin | 12.0 | 8.0 | 4.0 |
| SURF-2 | 0.6 | 0.6 | 0.6 |
| SURF-3 | 0.2 | 0.2 | 0.2 |
| PYR | 20.0 | 20.0 | 20.0 |
| HD | 20.0 | 20.0 | 20.0 |
| COL-5 | 20.0 | 20.0 | 20.0 |

Evaluation and Results

Stable cyan inkjet inks C-17, C-18 and C-19 were evaluated for dry and wet scratch resistance and solvent resistance. From Table 17 it can be seen that a resin/pigment ratio (ink C-19) below 2.0, decreases dry and wet scratch resistance as well as solvent resistance. At resin/pigment ratios above 5.0, the decap time is decreasing drastically.

TABLE 17

| Cyan ink-jet Ink | Resin/pigment ratio | Dry scratch resistance | Wet scratch resistance | Solvent resistance |
|---|---|---|---|---|
| C-17 | 4.0 | 1 | 1 | 1 |
| C-18 | 2.7 | 1 | 1 | 1 |
| C-19 | 1.3 | 2 | 3 | 2 |

The invention claimed is:

1. An ink jet ink comprising:
   water;
   a water-soluble organic solvent; and
   a polyurethane resin comprising an anionic group and a polyalkylene oxide in a side chain, the polyurethane resin obtained by the process of:
   reacting a polyester polyol, a polyether diol, a polyol including an anionic group, a diol with a molecular weight equal to or less than 400 g/mol, and a polyisocyanate at a corrected polyol ratio higher than 0.2, wherein the corrected polyol ratio is ((the molecular weight of the diol with the molecular weight equal to or less than 400 g/mol)×(a weight ratio of the polyester polyol to the molecular weight of the diol with the molecular weight equal to or less than 400 g/mol))/(a number average molecular weight of the polyester polyol); wherein
   the polyester polyol is obtained by reacting an aromatic polycarboxylic acid and a polyol.

2. The ink jet ink of claim 1, wherein the aromatic polycarboxylic acid is selected from the group consisting of phthalic acid, terephthalic acid, and isophthalic acid.

3. The ink jet ink of claim 1, wherein the aromatic polycarboxylic acid includes a mixture of a terephthalic acid and an isophthalic acid.

4. The ink jet ink of claim 1, wherein the polyether diol includes a compound according to Formula 1:

$$HO-CH_2-C(R1)(CH_2OH)-CH_2-(O-CH_2CH_2)_n-O-R2$$

wherein
R1 is methyl or ethyl;
R2 is H or $C_1$-$C_4$ alkyl; and
n represents an integer from 5 to 50.

5. The ink jet ink of claim 3, wherein the polyether diol is a compound according to Formula 1:

$$HO-CH_2-C(R1)(CH_2OH)-CH_2-(O-CH_2CH_2)_n-O-R2$$

wherein
R1 is methyl or ethyl;
R2 is H or $C_1$-$C_4$ alkyl; and
n represents an integer from 5 to 50.

6. The ink jet ink of claim 3, wherein the polyether diol includes α-[2,2-bis(hydroxymethyl)butyl]-ω-methoxy-poly(oxy-1,2-ethanediyl).

7. The ink jet ink of claim 1, wherein an amount of the polyether diol is equal to or less than 30 wt. % and more than 1 wt. % with respect to a total wt. % of the polyurethane resin.

8. The ink jet ink of claim 1, wherein an amount of the anionic group is equal to or less than 2.0 wt. % and more than 0.03 wt. % with respect to a total wt. % of the polyurethane resin.

9. The ink jet ink of claim 1, wherein the anionic group includes a carboxylate anion and/or carboxylic acid.

10. The ink jet ink of claim 3, wherein the anionic group includes a carboxylate anion and/or carboxylic acid.

11. The ink jet ink according to claim 1, further comprising a colorant.

12. The ink jet ink according to claim 3, further comprising a colorant.

13. The ink jet ink according to claim 5, further comprising a colorant.

14. An inkjet recording method comprising:
   providing a substrate;
   jetting on the substrate the ink jet ink according to claim 1;
   heating the substrate to a temperature equal to 80° C. or less before and/or during the step of jetting; and
   heating or drying the ink jet ink jetted on the substrate.

* * * * *